(12) United States Patent
Abdelli (10) Patent No.: US 11,449,057 B2
(45) Date of Patent: Sep. 20, 2022

(54) METHOD OF ASSISTING PILOTING A HYBRID ROTORCRAFT PROVIDED WITH A LIFT ROTOR AND WITH AT LEAST ONE PROPELLER PROPULSIVE ROTOR THAT GENERATES THRUST

(71) Applicant: AIRBUS HELICOPTERS, Marignane (FR)

(72) Inventor: Kamel Abdelli, Marseilles (FR)

(73) Assignee: AIRBUS HELICOPTERS, Marignane (FR)

( * ) Notice: Subject to any disclaimer, the term of this patent is extended or adjusted under 35 U.S.C. 154(b) by 279 days.

(21) Appl. No.: 16/868,647

(22) Filed: May 7, 2020

(65) Prior Publication Data

US 2020/0401142 A1    Dec. 24, 2020

(30) Foreign Application Priority Data

Jun. 20, 2019   (FR) ...................................... 1906686

(51) Int. Cl.
*G01D 7/00* (2006.01)
*G05D 1/02* (2020.01)
*B64C 27/26* (2006.01)

(52) U.S. Cl.
CPC ........... *G05D 1/0202* (2013.01); *B64C 27/26* (2013.01); *G01D 7/00* (2013.01); *G01D 2207/10* (2021.05)

(58) Field of Classification Search
CPC ...... G05D 1/0202; B64C 27/26; B64C 27/22; G01D 7/00; G01D 2207/10; B64D 43/00
See application file for complete search history.

(56) References Cited

U.S. PATENT DOCUMENTS

| 4,488,851 A | 12/1984 | Young |
| 6,195,598 B1 | 2/2001 | Bosqui et al. |
| 7,143,003 B2 * | 11/2006 | Certain .................... G01D 1/18 |
| | | 702/144 |

(Continued)

FOREIGN PATENT DOCUMENTS

| FR | 2756256 A1 | 5/1998 |
| FR | 2946322 A1 | 12/2010 |

(Continued)

OTHER PUBLICATIONS

French Search Report for French Application No. FR1906686, Completed by the French Patent Office, dated Feb. 7, 2020 9 pages.

*Primary Examiner* — John A Tweel, Jr.
(74) *Attorney, Agent, or Firm* — Brooks Kushman P.C.

(57) ABSTRACT

A method of facilitating piloting a hybrid rotorcraft having at least one propulsive rotor provided with a plurality of first blades and a lift rotor provided with a plurality of second blades, the hybrid rotorcraft having a power plant. The method includes a step of displaying on a single indicator a first pointer, the position of which along a movement path varies as a function of a first power from the power plant that is consumed by the propulsive system, and of displaying a second pointer, the position of which varies as a function of a second power of the power plant that is consumed by the lift rotor, a variable space between the first pointer and the second pointer representing a power margin from the power plant that is not used so long as the first pointer is situated between the first end and the second pointer.

12 Claims, 4 Drawing Sheets

(56) References Cited

U.S. PATENT DOCUMENTS

| | | | |
|---|---|---|---|
| 7,149,646 B2* | 12/2006 | Certain | B64D 43/00 |
| | | | 702/144 |
| 8,568,096 B2* | 10/2013 | Eglin | G05D 1/0858 |
| | | | 416/49 |
| 9,216,820 B2* | 12/2015 | Eglin | B64C 27/28 |
| 9,272,778 B2* | 3/2016 | Eglin | B64C 27/04 |
| 9,409,655 B1* | 8/2016 | Vallart | B64C 27/57 |
| 10,176,723 B2* | 1/2019 | Gadgil | G06F 3/00 |
| 2010/0312421 A1 | 12/2010 | Eglin | |
| 2018/0099739 A1 | 4/2018 | Salesse-Lavergne et al. | |
| 2019/0113403 A1 | 4/2019 | Adams et al. | |
| 2020/0398980 A1* | 12/2020 | Abdelli | B64C 27/24 |

FOREIGN PATENT DOCUMENTS

| | | |
|---|---|---|
| FR | 3041783 A1 | 3/2017 |
| FR | 3057243 A1 | 4/2018 |
| WO | 2016043942 A2 | 3/2016 |
| WO | 2016043943 A2 | 3/2016 |

* cited by examiner

METHOD OF ASSISTING PILOTING A HYBRID ROTORCRAFT PROVIDED WITH A LIFT ROTOR AND WITH AT LEAST ONE PROPELLER PROPULSIVE ROTOR THAT GENERATES THRUST

CROSS-REFERENCE TO RELATED APPLICATIONS

This application claims priority to European patent application No. FR 19 06686 filed on Jun. 20, 2019, the disclosure of which is incorporated in its entirety by reference herein.

BACKGROUND OF THE INVENTION

(1) Field of the Invention

The present invention relates to a method of assisting piloting a hybrid rotorcraft provided with a lift rotor and with at least one propeller propulsive rotor that generates thrust, and to such a rotorcraft.
The project leading to this patent application received funding from the EU Framework Programme for Research and Innovation Horizon 2020, through the grant agreement CleanSky 2 No. GAM-FRC-2014-001 Issue E.

(2) Description of Related Art

The term "hybrid rotorcraft" is used by convenience to designate a particular type of rotorcraft in the context of the invention. A "hybrid rotorcraft" has a fuselage carrying at least one rotary wing provided with a lift rotor. The lift rotor participates at least in providing lift for the aircraft, and indeed can also participate in providing forward propulsion for it.

For example, in order to attain a high forward speed, the hybrid rotorcraft also has at least one propeller propulsive rotor that generates thrust, and that is possibly of the puller or pusher propeller type. For example, the hybrid rotorcraft may be provided with two propeller propulsive rotors referred to as "lateral" or "transverse" propulsive rotors and arranged transversely on either side of the fuselage.

The lift rotor and the propeller propulsive rotors are driven in rotation by a power plant. The power plant comprises at least one engine or motor and a mechanical interconnection system for mechanically interconnecting the rotary elements. Such a mechanical interconnection system can comprise at least one main gearbox, at least one shaft, and coupling members, etc.

The limitations of an engine or motor and the limitations of a main gearbox can make it possible to define various operating ratings at which an engine or motor can operate, and in particular:

the takeoff rating, which is defined by a maximum takeoff power (PMD) and by a predetermined utilization duration for which the maximum takeoff power can be used;

the maximum continuous rating, which is defined by a maximum continuous power (PMC) corresponding, for example, to about 90% of the maximum takeoff power (PMD), and by a utilization duration for which said maximum continuous power can be used that is generally unlimited;

the extended power rating defined by an extended power that is substantially equivalent to or even equal to the maximum takeoff power (PMD) and by a predetermined and limited utilization duration for which said extended power can be used; and a transient rating that is defined by a maximum transient power (PMT).

On a multi-engined or multi-motored rotorcraft, the operating envelope also covers emergency higher power contingency ratings that are used only when only one of the engines or motors has failed:

the first emergency rating, which is sometimes referred to as the "one-engine-inoperative, 30 seconds" (OEI 30") rating, and which is defined by an emergency super-contingency power (PSU) that is often equal to approximately in the range 112% to 120% of the maximum takeoff power (PMD), and by a predetermined utilization duration for which the super-contingency power (PSU) can be used, it being conventionally possible for the super-contingency power to be used three times during a flight;

the second emergency rating, which is sometimes known as the "one-engine-inoperative, two minutes" (OEI 2') rating, and which is defined by a maximum emergency contingency power (PMU) that is, for example, equal to approximately in the range 105% to 112% of the maximum takeoff power (PMD) and by a predetermined utilization duration for which the predetermined maximum contingency power (PMU) can be used; and the third emergency rating, which is sometimes referred to as the "one-engine-inoperative, continuous" (OEI cont) rating, and which is defined by an intermediate emergency contingency power (PIU) that is substantially equal to the maximum takeoff power (PMD), and by an unlimited duration of utilization at this intermediate contingency power (PIU) for the remainder of the flight after the engine has failed.

The hybrid rotorcraft may have first control means and second control means for respectively collectively and cyclically controlling the blades of the lift rotor. In addition, the hybrid rotorcraft includes at least one thrust control mechanism that is suitable for modifying the pitch of the blades of the propulsive rotors collectively and by the same amount. When two propeller propulsive rotors are present, antitorque and steering control functions may be performed by using a yaw control for modifying differently the thrusts exerted by the propulsive rotors, e.g. by the pilot using a rudder bar.

Optionally, the thrust control mechanism may be incorporated into an electrical flight control architecture. For example, the thrust control mechanism may be provided with a thrust control interface that can be operated by a pilot and with at least one movement sensor that is electrically connected to at least one computer. For example, and for safety reasons, at least two dissimilar sensors are used. Arranging a thrust control interface and associated sensors in a confined location can be difficult. For example, a collective pitch lever for controlling the collective pitch of the blades of the lift rotor usually has a stick-forming grip carrying a box or head that is provided with a front face on which multiple switches or buttons are disposed. Adding a thrust control interface and the associated sensors to a box that has an environment that is already cluttered is not simple.

In this context, Document WO 2016/043942 discloses a control mechanism that is provided with a rotary switch. That rotary switch is constrained to move in rotation with a shaft of a motor. An encoder then determines the angular position of the shaft.

Document WO 2016/043943 discloses a control mechanism that is provided with a switch that is movable between a neutral position and a plurality of non-neutral positions. A first non-neutral position causes the blades of a propeller to move in a first direction, a second non-neutral position causes the blades of a propeller to move in a second direction, and a third non-neutral position causes the blades of a propeller to move into positions in which zero thrust is generated by the propeller.

Document FR 3 057 243 discloses an electric control device provided with operating or "manipulation" means. In addition, the electric control device has a first measurement system and a second measurement system that respectively take a first measurement and a second measurement of the current position of the manipulation means. A processor unit compares the first measurement with the second measurement in order to generate a control signal as a function of said current position, said processor unit considering that the manipulation means are in a neutral position when the first and second measurements do not correspond to the same position for the manipulation means. If inconsistency is detected, the order or command is considered to be defective and is therefore not taken into account and is inhibited.

Document U.S. Pat. No. 4,488,851 discloses a power management system.

Document FR 3 041 783 discloses a control interface with haptic feedback, that control interface including a magnetorheological fluid module. In addition, a strain gauge is configured to detect deformation of a component consequent upon a force being exerted on a moving element.

Furthermore, a conventional rotorcraft of the helicopter type includes a first-limitation instrument for assessing operation of its power plant with regard to limits. Such a first-limitation instrument does not appear adapted to a hybrid rotorcraft that has not only a lift rotor but also at least one propeller propulsive rotor.

Document FR 2 946 322 discloses a method of assisting piloting for an aircraft having a lift rotor and two propeller propulsive rotors. That method includes steps of determining a maximum mean pitch for the blades of the propulsive rotors as a function of a power gradient, and of displaying the maximum mean pitch on a dedicated indicator, the maximum mean pitch being displayed on a pitch graduated scale that is swept by a needle or pointer.

Document US 2019/0113403 is also known.

Documents US 2010/312421 and FR 2 756 256 are also known.

BRIEF SUMMARY OF THE INVENTION

An object of the present invention is thus to propose a method of assisting piloting that makes it possible to facilitate piloting a hybrid rotorcraft.

The invention thus provides a method of facilitating piloting a hybrid rotorcraft, the hybrid rotorcraft having a propulsive system comprising at least one propulsive rotor provided with a plurality of first blades having a first variable pitch at least for participating in providing forward propulsion for the hybrid rotorcraft, said hybrid rotorcraft further including a lift rotor provided with a plurality of second blades having a second variable pitch at least for participating in providing lift for the hybrid rotorcraft, said hybrid rotorcraft having a power plant provided with at least one engine operating at at least one rating for driving said lift rotor in rotation and for driving each propulsive rotor of said at least one propulsive rotor in rotation.

This method includes the following step: displaying on a single indicator a first pointer, the position of the first pointer along a movement path varies as a function of a first power from the power plant that is consumed by said propulsive system, and a second pointer, the position of second pointer along said movement path varies as a function of a second power from the power plant that is consumed by said lift rotor, said movement path extending from a first end to a second end, said first pointer moving towards the second end on condition that the first power increases, and said second pointer moving towards the first end on condition that the second power increases, a variable space between the first pointer and the second pointer representing a power margin from said power plant that is not used at said rating so long as the first pointer is situated between the first end and the second pointer.

The expression "power margin from said power plant that is not used at said rating" represents a power margin that the power plant can develop at the current operating rating, which power margin may be used in full or in part both by the lift rotor and by the propulsive system.

The method is therefore applicable to a rotorcraft having multiple rotors. In particular, the rotorcraft may include at least one lift rotor and at least one propeller propulsive rotor, and, for example, two or more propulsive rotors. Each propulsive rotor may be a puller or a pusher propulsive rotor. Each propulsive rotor may be a lateral or "transverse" rotor, i.e. it may be arranged laterally and transversely to one side of a fuselage.

The plurality of ratings may comprise at least one of the above-mentioned ratings, namely: a takeoff rating; a maximum continuous rating; an extended power rating; a transient rating; a first emergency rating; a second emergency rating; and a third emergency rating. Monitoring parameters for monitoring the engine may include an engine torque, a temperature, and/or a speed of rotation. For example, for a turboshaft engine, the monitoring parameters may include at least one parameter to be selected from a list including the speed of rotation of a gas generator of the turboshaft engine, the engine torque of the turboshaft engine, and the temperature of the gas at the inlet to a free turbine of the turboshaft engine. For example, it is possible to measure and use the torque exerted on a main gearbox of the power plant that is interposed between an engine and a rotor in order to determine the engine torque.

In this method, an on-board computer computes the position of the first pointer and the position of the second pointer, the first pointer and the second pointer being mounted to move along the movement path. Under such circumstances, the first pointer may be movable from the first end towards the second end when the first power increases, the second pointer being movable from the second end towards the first end when the second power increases. The first distance between the first end and the first pointer is the image of the first power consumed by the propulsive system, while the second distance between the second end and the second pointer is the image of the second power consumed by the lift rotor. Therefore, when the first power increases, the computer controls the indicator to move the first pointer in a first direction towards the second pointer. Similarly, when the second power increases, the computer controls the indicator to move the second pointer in a second direction towards the first pointer. The single movement path thus has two inverted scales of graduations, namely a first scale dedicated to the first pointer that increases in the first direction and a second scale dedicated to the second pointer that increases in the direction opposite to the first direction, it being possible, for example, for each scale to be a scale of collective pitch expressed as power. The movement path may include numerical values for each of the two scales.

Therefore, the space between the first pointer and the second pointer is the image of the power from the power plant that is available at the current operating rating, i.e. the power reserve that can be used by the propulsive system and/or by the lift rotor.

This method thus proposes a single, simple indicator that enables the available power reserve to be seen easily.

The method may also have one or more of the following characteristics.

In one aspect, the method may include a step of determining with an on-board computer the first power and the second power, a step of determining a target position on said indicator for the first pointer as a function of said first power, and a step of determining a target location on said indicator for the second pointer as a function of said second power.

By way of example, the first distance between the first end and the first pointer may be equal to the first power multiplied by a variable, it being possible for the second distance between the second end and the second pointer to be equal to the second power multiplied by said variable, the value of said variable varying as a function of the current rating and/or of the outside conditions and/or of the wear of the engines. The first distance and the second distance may take the form of an angle or of a curved length over a circular scale, or of a length along a linear scale.

In one aspect, the method may include a step of determining with an on-board computer a first current collective pitch of the first blades and a second current collective pitch of the second blades, a step of determining a target position on said indicator for the first pointer as a function of the first current collective pitch, and a step of determining a target location on said indicator for the second pointer as a function of the second current collective pitch.

The computer may apply a model stored in a memory to determine the position of each pointer as a function of the collective pitch of the corresponding blades, which model may take into consideration the current rating and/or the outside conditions and/or the wear of the engines or motors and/or the dynamic characteristics of the aircraft in its positioning in three-dimensional space.

In another aspect, the first pointer may also point to an air speed scale for the air speed of the hybrid rotorcraft.

The first pointer may be arranged facing an air speed scale. The same indicator then gives an indication relating to the available power and to the air speed of the rotorcraft. Increasing the first pitch of the first blades induces both an increase in the consumed first power and in the air speed. Thus, an air speed scale may be uniform and consistent with a scale relating to operation of the propulsive system.

In a first implementation, the movement path may be in the shape of a first circular arc.

In another aspect, when the first pointer points to an air speed scale for the air speed of the hybrid rotorcraft, the air speed scale may be positioned on a second circular arc adjoining the first circular arc.

In another aspect, the first circular arc may be situated above an artificial horizon.

Optionally, the movement path is positioned between an air speed scale and the artificial horizon.

In a second implementation, the first pointer and the second pointer may be movable linearly along a direction superposed on an air speed scale for the air speed of the hybrid rotorcraft.

Independently, of the implementation, the method may include a step of determining at least one first pitch limit for the pitch of the first blades, and a step of displaying said at least one first pitch limit facing said movement path.

In one example, for each propulsive rotor, the computer determines a computation power margin between a power limit for the propulsive rotor and a current torque power consumed by said propulsive rotor, and then the computer determines the minimum between an engine power margin for each engine and each computation power margin. The computer deduces from said minimum a limit power representing said first pitch limit for the pitch of the first blades.

For example, for each propulsive rotor, the computer determines a computation torque margin between a torque limit for the propulsive rotor and a current torque exerted on said propulsive rotor, and then the computer determines the minimum between an engine torque margin for each engine and each computation torque margin. The computer deduces from said minimum a limit power representing said first pitch limit for the pitch of the first blades.

In one aspect, the method may include a step of determining at least one second pitch limit for the pitch of the second blades, and a step of displaying said at least one second pitch limit facing said movement path.

For example, the computer determines a power limit representing said second pitch limit for the pitch of the second blades as a function of a limit rotor torque that is stored in a memory.

In addition to a method, the invention also provides a hybrid rotorcraft, the hybrid rotorcraft having a propulsive system comprising at least one propulsive rotor provided with a plurality of first blades having a first variable pitch at least for participating in providing forward propulsion for the hybrid rotorcraft, said hybrid rotorcraft further including a lift rotor provided with a plurality of second blades having a second variable pitch at least for participating in providing lift for the hybrid rotorcraft, said hybrid rotorcraft having a power plant provided with at least one engine operating at at least one rating for the purposes of driving said lift rotor in rotation and of driving each propulsive rotor of said at least one propulsive rotor in rotation.

This hybrid rotorcraft includes an on-board computer and an indicator that are configured to apply the method of the invention.

BRIEF DESCRIPTION OF THE DRAWINGS

The invention and its advantages appear in greater detail from the following description of examples given by way of illustration with reference to the accompanying figures, in which.

DETAILED DESCRIPTION OF THE INVENTION

Elements that are present in more than one of the figures are given the same references in each of them.

Figure 1:
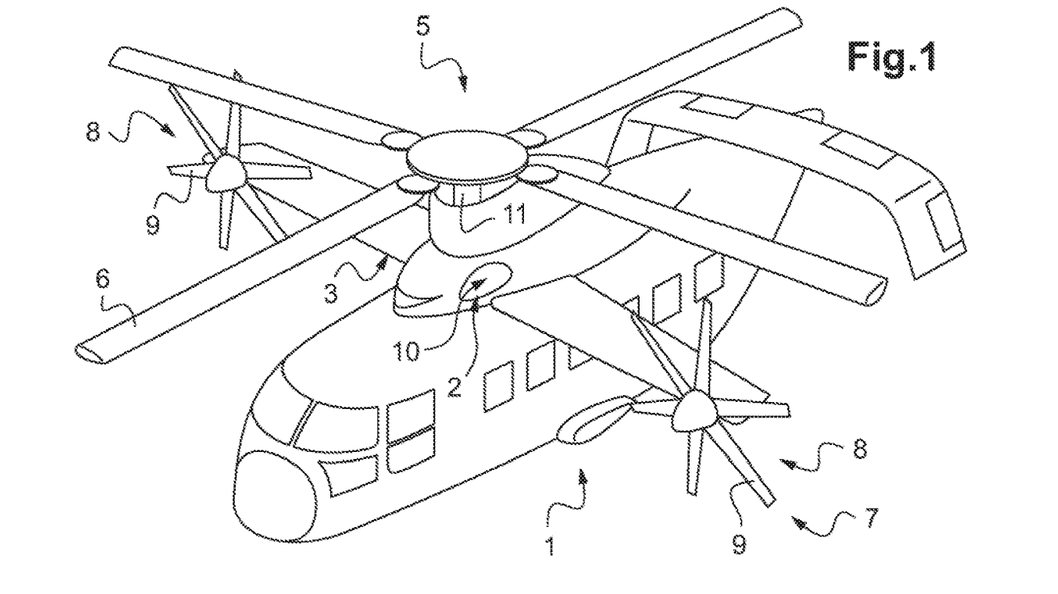
FIG. 1 is an isometric view of a hybrid rotorcraft.

FIG. 1 shows an aircraft 1 of the hybrid rotorcraft 1 type of the invention that is provided with a fuselage carrying at least one lift rotor 5 and a propulsive system 7.

The propulsive system 7 includes at least one propulsive rotor 8, e.g. of the propeller type, comprising a plurality of first blades 9 having a first variable pitch that can be varied at least collectively or indeed only collectively, for example. In one possibility, the hybrid rotorcraft 1 includes a first propeller propulsive rotor and a second propeller propulsive rotor that are disposed on either side of the fuselage 1, optionally at either outer end of a wing 3. The lift rotor 5 is provided with a plurality of second blades 6 having a second variable pitch that can be varied collectively and cyclically, for example.

In order to drive the lift rotor 5 and each propulsive rotor 8 in rotation, the aircraft 1 includes a power plant 2 provided with at least one engine 10, e.g. of the turboshaft engine type. In addition, the power plant 2 may include an interconnection system 11 including at least one power transmission gearbox, at least one transmission shaft, etc.

The speeds of rotation of the outlet shafts of the turboshaft engines 10, of the propulsive rotors 8, of the lift rotor 5, and of the interconnection system 11 are optionally mutually proportional, with the proportionality ratio being variable or constant regardless of the flight configuration of the hybrid rotorcraft 1 under normal operating conditions of the integrated drive system.

Furthermore, each engine 10 operates within an operating envelope including one or more of the above-mentioned power ratings, namely, for example: a takeoff rating defining a maximum takeoff power (PMD), a maximum continuous rating defining a maximum continuous power (PMC), a transient rating defining a maximum transient power (PMT), a first emergency rating defining an emergency super-contingency power (PSU), a second emergency rating defining a maximum emergency contingency power (PMU), and/or a third emergency rating defining an intermediate emergency contingency power (PIU).

Figure 2:
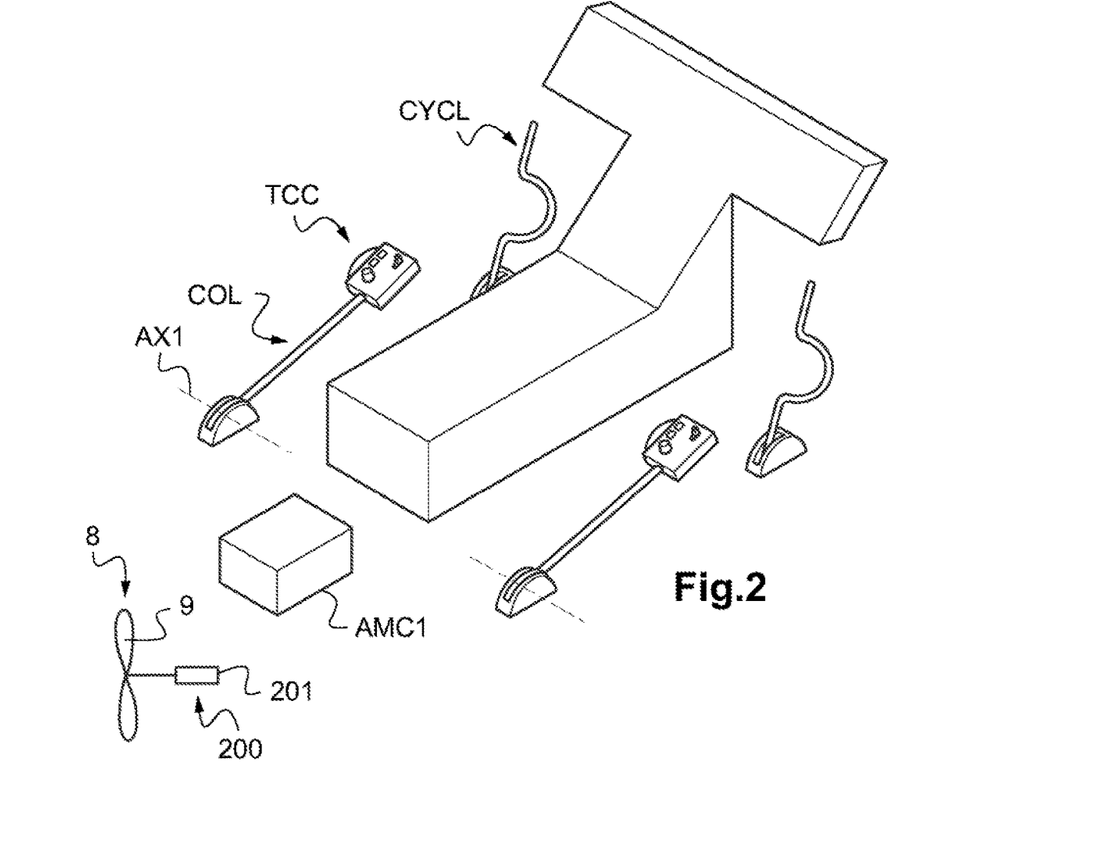
FIG. 2 is a diagram showing the piloting controls for piloting a hybrid rotorcraft.

In order to control the hybrid rotorcraft 1, and with reference to FIG. 2, each pilot may have a thrust control TCC for collectively changing the first pitch of the first blades of each propulsive rotor 8, and, for example, a mean pitch of the first blades 9 of the propulsive rotors 8.

More precisely, the thrust control TCC acts identically on the first pitches of the first blades 9 in order to obtain a collective variation in the first pitch of the first blades 9. For example, the pilot might request an increase of 5° in the mean pitch of all of the first blades 9 of the propulsive rotors 8 so as to increase the resulting thrust that is generated in particular by the first propulsive rotor and by the second propulsive rotor, the mean pitch of the first blades 9 of the first and second propulsive rotors optionally being equal to the half-sum of the pitches of the first blades 9 of the two propulsive rotors 8.

The thrust control may transmit an order, e.g. to at least one piloting computer or "Aircraft Management Computer" AMC1, said piloting computer AMC1 controlling a drive system 200 connected to the first blades 9 of the propulsive rotors 8. For example, the piloting computer AMC1 controls at least one actuator 201 of said drive system 200.

In order to control the yaw attitude or yaw trim of the hybrid rotorcraft 1, the pilot may have a yaw control device provided with yaw control means (not shown), e.g. means for controlling the pitches of the first blades 9 of the two propulsive rotors 8 differently. For example, only the collective pitch of the first blades 9 of one propulsive rotor 8 is modified in order to act on the yaw behavior of the hybrid rotorcraft.

Finally, the hybrid rotorcraft 1 is provided with usual control means CYCL, COL for collectively and cyclically controlling the pitch of the second blades 6 of the lift rotor 5. For example, the thrust control TCC may be carried by a pitch lever COL that is mounted to move in rotation about a "piloting" axis AX1 for the purpose of controlling the second pitch of the second blades 6 collectively. A cyclic control CYCL may control the second pitch of the second blades 6 of the lift rotor 5 cyclically.

Figure 3:
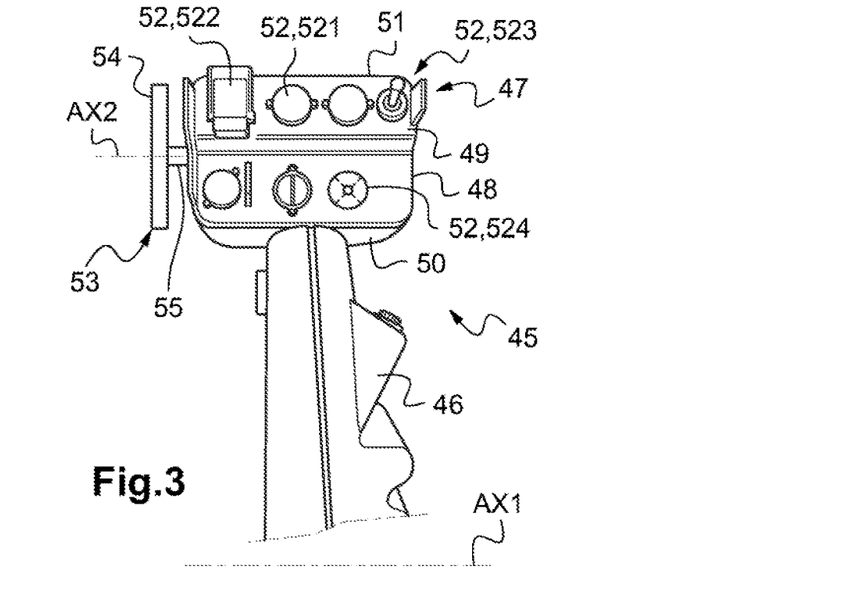
FIG. 3 is a diagram showing a flight control handle or "piloting handle" as seen from above.

In this context, FIG. 3 shows an example of a flight control handle 45. For example, but not exclusively, said flight control handle 45 may be arranged on the pitch lever COL shown in the preceding figure, on the cyclic control CYCL, or on some other type of vehicle.

Regardless of how it is arranged, the flight control handle 45 may include a stick-forming grip 46 that is optionally hollow. For example, the stick-forming grip 46 may be arranged on a tube of a lever. In addition, the flight control handle 45 is provided with an end box 47 carried by the stick-forming grip 46.

Said end box 47 includes a hollow shell 48. The shell 48 is provided, in particular, with a top face 51. In addition, the end box 47 also includes at least one control 52 that can be operated by a pilot holding the flight control handle 45. Each control 52 projects from the top face 51 towards an external environment EXT. In other words, each control 52 includes a member that extends outside the shell so that it can be operated by a pilot. Furthermore, each control 52 is mounted to move relative to the shell 48. In the example shown, extending above the top face 51 is/are at least one control 52 of the push button type 521 and/or a control 52 of the switch type 522 and/or a control 52 of the lever type 523 and/or a control 52 of the Chinese hat type 524.

Furthermore, the shown flight control handle 45 has a rotary knob 53. The rotary knob 53 is mounted to move in rotation relative to the end box 47 about an axis of rotation AX2. When the flight control handle 45 is mounted to move about a flight control axis AX1, e.g. by being arranged on a lever COL that collectively controls the second pitch of the second blades of a lift rotor 5, the axis of rotation AX2 may be parallel to the flight control axis AX1.

Figure 4:
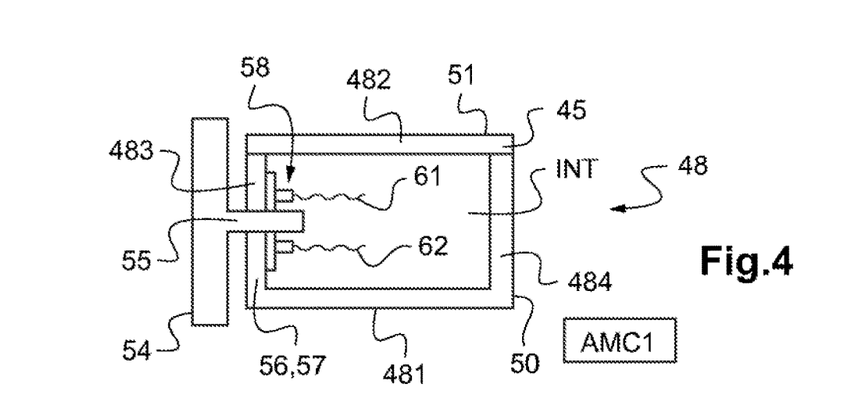
FIG. 4 is a diagram showing a wall incorporating an electronic circuit of said flight control handle.

With reference to FIG. 4, the shell 48 delimits a hollow internal volume INT. For example, the internal volume INT is delimited in an elevation direction by a bottom wall 481 and by a top wall 482, in a transverse direction and seen from above by a left wall 483 and by a right wall 484, and from front to back by a front wall and by a rear wall. For example, the various walls of the shell 48 are formed by one or more elements. In the example shown, the bottom wall 481, the left wall 483, the right wall 484, the front wall and the rear wall together form a container that is closed reversibly by the top wall 482.

Independently of this aspect, the rotary knob 53 may have a wheel 54 arranged outside the shell 48, i.e. outside the internal volume INT. Optionally, the rotary knob 53 may also have a shaft 55 that is constrained to rotate with the wheel 54 about the axis of rotation AX2.

Said shaft 55 is carried by the shell 48 and in particular by a side 57 of the shell 48, e.g. a side 57 adjoining the top face 51. For example, said side 57 may be the above-mentioned left wall or the above-mentioned right wall. The shaft 55 is also mounted to move in rotation relative to the side 57 about the axis of rotation AX2. For example, a bearing is arranged between the shaft 55 and the side 57.

In another example (not shown), the wheel 54 is mounted to move in rotation about the axis of rotation AX2 by turning about a stationary shaft.

Figure 5:
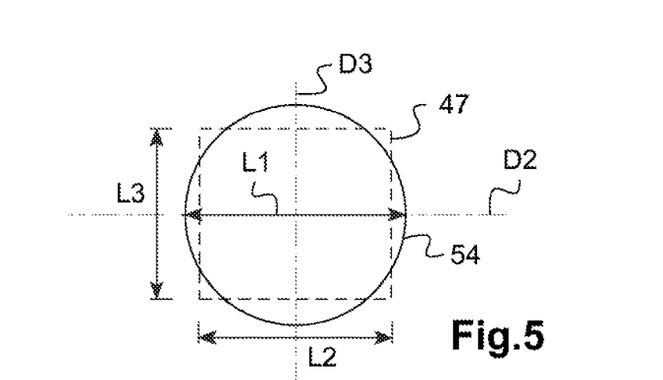
FIG. 5 is a diagram showing the flight control handle as seen from one side.

With reference to FIG. 5, the wheel 54 may have a diameter L1 that is maximized relative to the shell 48 so as to be readily accessible for an index finger of a pilot. Said diameter L1 may be greater than a length of the shell 48. Said diameter L1 may, however, be established in order to avoid any rubbing, hindrance, or undesired control with respect to the hand of a pilot. For example, as seen in a direction going from the wheel 54 to the shell 48, said shell 48 may extend longitudinally along a longitudinal direction D2 over a first length L2 and in elevation along an elevation direction D3 over a second length L3, the first length L2 and/or the second length L3 being less than the diameter L1.

In another aspect and with reference to FIG. 4, the end box 47 has an electronic wall 56 incorporating the electronic circuit 58. For example, the side 57 carrying a shaft 55 of the rotary knob 53 forms said electronic wall 56. Such an electronic wall 56 may be obtained by using a plastronics method.

The electronic circuit 58 is provided with at least one sensor co-operating with the rotary knob 53. The electronic circuit 58 generates at least one signal that varies when the wheel 54 is caused to move in rotation about the axis of rotation AX2. For example, such a signal may be an analog signal or a digital signal.

For example, the electronic circuit 58 may further include at least one electrically conductive track. In addition, the electronic circuit 58 may be connected to at least one wired electrical connection 61, 62 running through or along the stick-forming grip 46.

Optionally, the electronic circuit 58 includes at least one pair of dissimilar sensors 59, 60, each of which generates a signal that varies as a function of a movement in rotation of the wheel 54. The two sensors 59, 60 in any one pair may communicate with the same piloting computer AMC1. For example, the two sensors in any one pair respectively comprise a Hall effect sensor 59 and a potentiometer 60.

Figure 6:
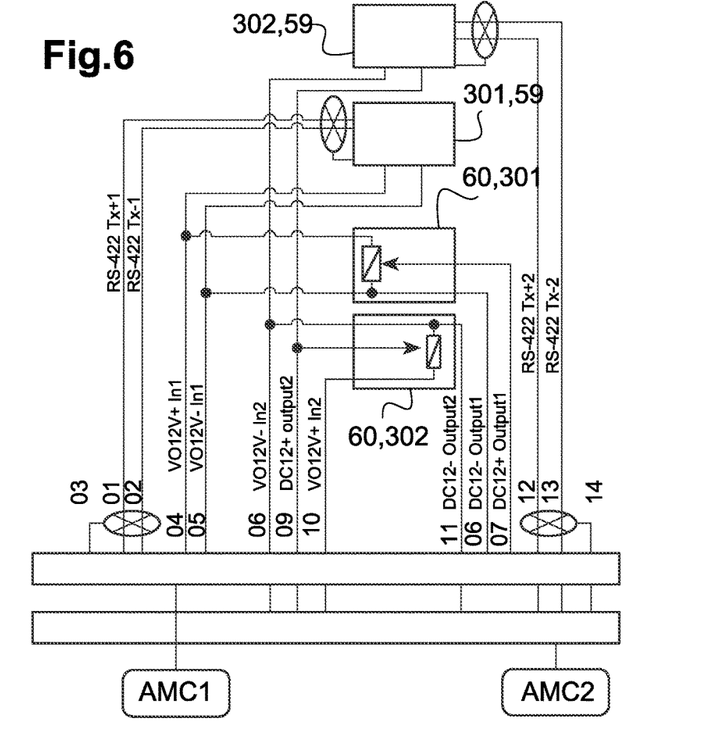
FIG. 6 is a diagram showing an electric circuit connecting such an electronic wall to at least one computer.

With reference to FIG. 6, the electronic circuit 58 may have at least two said pairs 301, 302 of sensors 59, 60, the two sensors 59, 60 in any one pair 301 communicating with a first piloting computer AMC1 and the two sensors 59, 60 of the other pair 302 communicating with a second piloting computer AMC2.

In other alternatives, instead of the rotary knob, the flight control handle 45 has a cursor mounted to move in translation or a touch-sensitive face.

Independently of the type of the thrust control, in order to avoid being faced with maneuvers that might endanger the hybrid rotorcraft 1, said hybrid rotorcraft 1 may be provided with a piloting assistance device 15.

Figure 7:
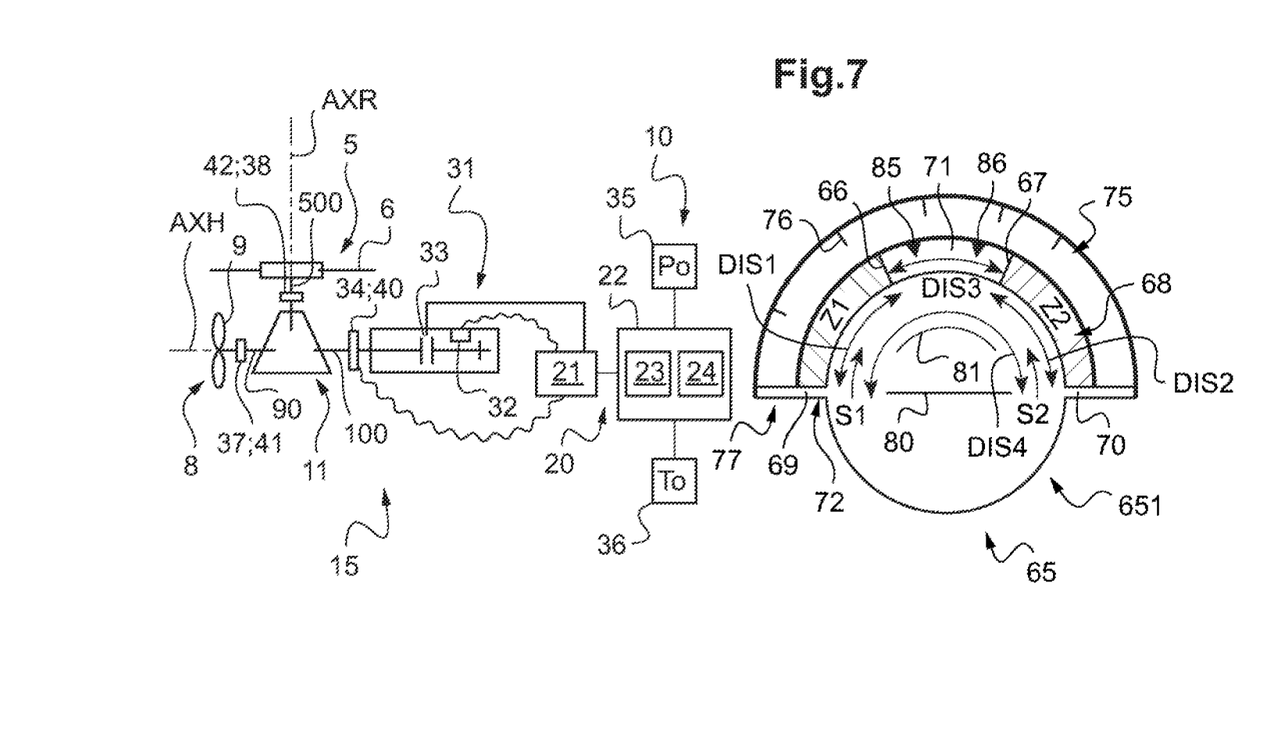
FIG. 7 is a diagram showing a device for assisting piloting of such a hybrid rotorcraft with an indicator of the invention that has a curved movement path.

FIG. 7 shows such a piloting assistance device 15 of the invention. This piloting assistance device 15 includes an on-board computer 20. In addition, the piloting assistance device 15 includes an indicator 65 controlled by the on-board computer 20, as well as a plurality of sensors that are connected to the on-board computer 20.

The on-board computer 20 may comprise one computer or else a plurality of computers that communicate with one another. In the example shown, the on-board computer 20 includes at least one central computer 22, and one usual engine computer 21 per engine or one usual motor computer per motor, or indeed one or more of the above-mentioned piloting computers. The central computer 22 may be merged with one of the above-mentioned piloting computers.

Such an engine computer 21 is, for example of the type of a computer of a system known as a Full Authority Digital Engine Control (FADEC). Each engine computer 21 is then connected to at least one engine sensor. Such an engine computer 21 may regulate a fuel burning engine, e.g. by controlling its fuel metering device, or else it may regulate an electric motor. For each operating rating, such an engine computer 21 may also deliver the available power margin for each engine relative to the maximum power at that rating, and may deliver a value for a current power being delivered by said engine or motor.

In another example, only one computer is used.

Each computer may, for example, comprise at least one processor 23, and at least one memory 24, at least one integrated circuit, at least one programmable system, and/or at least one logic circuit, these examples not limiting the scope given to the term "computer".

The on-board computer 20 is then connected by wired or wireless connections to sensors 31 for measuring monitoring parameters for monitoring each engine 10. For example, each engine computer 21 is then connected to at least one set of engine sensors. The monitoring parameters for monitoring an engine 10 may include at least one parameter to be selected from a list that includes the speed of rotation Ng of a gas generator of each engine 10, the torque TQ of each engine 10, and a gas temperature, e.g. the gas temperature T45 at the inlet to a low-pressure free turbine of each engine 10. Under such circumstances, for each engine 10, the piloting assistance device 15 may possess a measurement sensor 32 for measuring the speed of rotation Ng of the engine, a torque meter 34 for measuring the torque TQ developed by the engine 10 on an engine outlet shaft 100 driven by said engine 10, and a measurement sensor 33 for measuring the gas temperature T45 of the engine 10. A sensor 40 for sensing engine speed of rotation may measure the speed of rotation of the engine outlet shaft.

Furthermore, the piloting assistance device 15 may include a sensor 35 for sensing outside pressure $P_o$ and a sensor 36 for sensing outside temperature $T_o$, which sensors are connected to the on-board computer 20, and, for example, to the central computer 22.

Furthermore, the on-board computer 20, and, for example, the central computer 22, may be connected to one propulsive rotor torque meter 37 per propulsive rotor 8. Each propulsive rotor torque meter 37 may measure torque on a propulsive rotor shaft 90 that drives the propulsive rotor 8 in rotation about its axis of rotation AXH. A sensor 41 for sensing propulsive rotor speed of rotation may measure the speed of rotation of the propulsive rotor shaft 90.

The on-board computer 20, and, for example, the central computer 22, may be connected to a rotor torque meter 38. The rotor torque meter 38 may measure torque on a rotor shaft 500 that drives the lift rotor 5 in rotation about its axis of rotation AXR. A sensor 42 for sensing rotor speed of rotation may measure the speed of rotation of the rotor shaft 500.

The on-board computer 20, and, for example, the central computer 22, may be connected to a mean pitch sensor that measures the current mean pitch of the first blades of the propulsive rotor 8 and/or to an air speed sensor that is suitable for measuring the true air speed of the hybrid rotorcraft and/or to a speed-of-rotation sensor that measures the speed of rotation of the propulsive rotors 8 and/or to a speed-of-rotation sensor that measures the speed of rotation of the lift rotor 5 and/or to a pitch sensor that measures the collective pitch of the second blades of the lift rotor 5.

Furthermore, the on-board computer 20 is connected to an indicator 65 via usual connections (not shown). Such an indicator has a screen 651 and optionally a computer, or indeed one of the above-mentioned computers.

The indicator 65 has a movement path 68 that extends from a first end 69 to a second end 70.

In the method of the invention, the on-board computer 20 transmits a signal to the indicator 65. As a function of that signal, the indicator 65 positions a first pointer 66 on the movement path 68. The position of the first pointer 66 is computed by the on-board computer 20 or by the indicator 65 and varies as a function of a first power P1 from the power plant 2 that is consumed by the propulsive system 7.

In addition, the indicator 65 positions a second pointer 67 on the movement path 68. The position of the second pointer 67 is computed by the on-board computer 20 or by the indicator 65 and varies as a function of a second power P2 from the power plant 2 that is consumed by the lift rotor 5.

In particular, the first pointer 66 moves in a first movement direction S1 towards the second end 70 when the first power P1 increases. Conversely, the second pointer 67 moves in a second movement direction S2 towards the first end 69 when the second power P2 increases, the second direction S2 being opposite to the first direction S1.

In addition, a variable space or gap 71 separates the first pointer 66 and the second pointer 67 so long as the power plant 2 has a power margin relative to the maximum power associated with the current rating.

Therefore, a first distance DIS1 between the first end and the pointer 66 is established to be the image of the first power P1, a second distance DIS2 between the second end 70 and the second pointer 67 being the image of the second power P2. In addition the space or gap 71 between the first pointer 66 and the second pointer 67 extends over a third distance DIS3 representing a power margin from the power plant 2 that is not used at the current rating so long as the first pointer 66 is situated between the first end 69 and the second pointer 67. The fourth distance DIS4 that corresponds to the sum of the first distance DIS1, of the second distance DIS2, and of the third distance DIS3 is the image of the maximum available power at the current rating.

Optionally, the indicator 65 gives a first zone Z1 that is situated between the first end 69 and the first pointer 66 a first background that is visually identifiable so as to facilitate reading the information. The indicator 65 may give a second zone 72 situated between the second end 70 and the second pointer 67 a second background that is visually identifiable and that is optionally different from the first background. For example, the first zone Z1 and the second zone Z2 have hatchings and/or colors that are different.

In an example of computing the positions of the pointers 66, 67, the on-board computer 20 determines the values of the first power P1 and of the second power P2 and transmits these values and the maximum power to the indicator 65. The indicator 65 then determines a target position on the indicator 65 for the first pointer 66 as a function of the first power P1 and a target position referred to as a "target location" for the second pointer 67 as a function of said second power P2. The maximum power may be taken into account. In an example, the first distance DIS1 is computed as a function of the product of a constant multiplied by a quotient of the first power P1 divided by the maximum power, the second distance DIS2 being computed as a function of the product of said constant multiplied by a quotient of the second power P2 divided by the maximum power.

Optionally, the on-board computer 20 may compute the first power P1 by means of the sum of the power consumed by each propulsive rotor. This power consumed by each propulsive rotor may be obtained by taking the propulsive rotor torque 8 exerted on the propulsive rotor shaft 90 and multiplying it by the speed of rotation of the propulsive rotor shaft 90, these values being measured respectively by the propulsive rotor torque meter 37 and by the propulsive rotor speed-of-rotation sensor 41. Alternatively, the on-board computer 20 computes the power consumed by each propulsive rotor 8 by means of polars that are stored in a memory, and by means of parameters of the propulsive rotor 8 such as the radius of the second blades, the speed at the tips of the first blades of the propulsive rotor, the air speed of the aircraft, the pitch of the second blades, etc.

Optionally, the on-board computer 20 may compute the second power P2 consumed by the lift rotor by taking the torque exerted on the rotor shaft 500 and multiplying it by the speed of rotation of the rotor shaft 500, those values being measured respectively by the rotor torque meter 38 and by the rotor speed-of-rotation sensor 42.

In another computation example, the on-board computer 20 determines the values of a current first collective pitch of the first blades 9 and of a second current collective pitch of the second blades 6. The indicator 65 then determines a target position on the indicator 65 for the first pointer 66 as a function of the first current collective pitch and a target position referred to as a "target location" for the second pointer 67 as a function of the second current collective pitch.

Regardless of the computation, each pointer may show a collective pitch expressed as power.

In another aspect, the first pointer 66 may also point to an air speed scale 75 for the air speed of the hybrid rotorcraft 1. For example, the first pointer moves in parallel with graduations 76, each of which relates to a respective air speed.

In another aspect, the on-board computer may compute at least one first pitch limit 85 for the pitch of the first blades 9 and transmit a signal carrying said first pitch limit to the indicator. The indicator computes the location of a symbol representing the first pitch limit 85, optionally via a conversion into equivalent power, along the movement path and displays said symbol illustrating the first pitch limit 85 along the movement path 68.

In another aspect, the on-board computer 20 may compute at least one second pitch limit 86 for the pitch of the second blades 6, optionally via a conversion into equivalent power, and transmit a signal carrying said second pitch limit 86 to the indicator. The indicator computes the location of a symbol representing the second pitch limit 86, along the movement path and displays said symbol illustrating the second pitch limit 86 along the movement path 68.

In another aspect and with reference to the embodiment shown in FIG. 7, the movement path 68 may be in the shape of a first circular arc 72. Where applicable, the air speed scale 75 is positioned on a second circular arc 77 adjoining the first circular arc 72, e.g. above the first circular arc 72.

Optionally, the first circular arc 72 may be situated above an artificial horizon 80 and/or above a heading 81.

Figure 8:
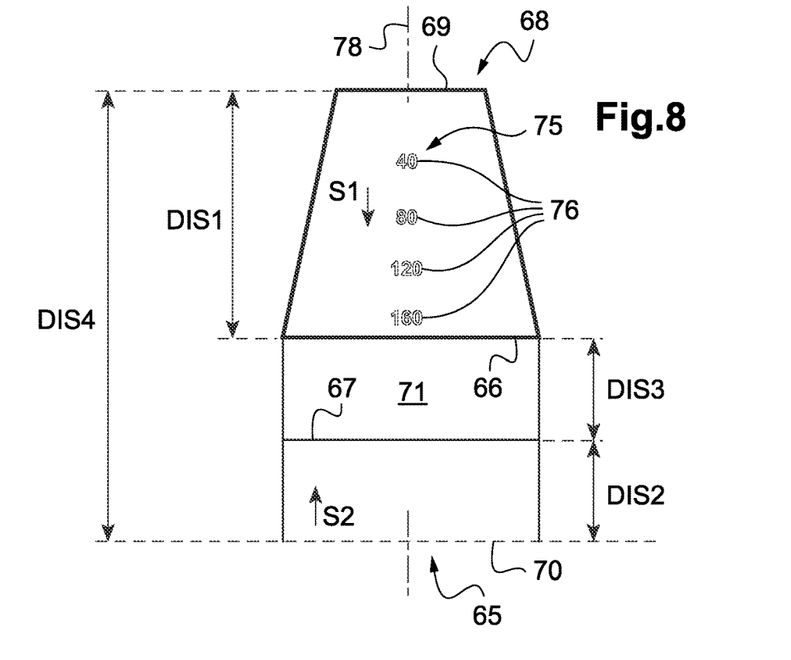
FIG. 8 is a diagram showing an indicator of the invention that has a linear movement path.

In the embodiment shown in FIG. 8, the first pointer 66 and the second pointer 67 may be configured to move linearly, e.g. along a direction 78 superposed on an air speed scale 75 for the air speed of the hybrid rotorcraft 1, said air speed scale 75 being provided with graduations 76.

Naturally, the present invention can be the subject of numerous variants as to its implementation. Although several implementations and embodiments are described, it should readily be understood that it is not conceivable to identify exhaustively all possible implementations and embodiments. It is naturally possible to envisage replacing any of the means described by equivalent means without going beyond the ambit of the present invention.

What is claimed is:

1. A method of facilitating piloting a hybrid rotorcraft, the hybrid rotorcraft having a propulsive system comprising at least one propulsive rotor provided with a plurality of first blades having a first variable pitch at least for participating in providing forward propulsion for the hybrid rotorcraft, the hybrid rotorcraft further including a lift rotor provided with a plurality of second blades having a second variable pitch at least for participating in providing lift for the hybrid rotorcraft, the hybrid rotorcraft having a power plant provided with at least one engine operating at at least one rating for driving the lift rotor in rotation and driving each propulsive rotor of the at least one propulsive rotor in rotation;

wherein the method includes the following step: displaying on a single indicator a first pointer and a second pointer, a position of the first pointer along a movement path varies as a function of a first power from the power plant that is consumed by the propulsive system, a position of the second pointer along the movement path varies as a function of a second power from the power plant that is consumed by the lift rotor, the movement path extending from a first end to a second end, the first pointer moving towards the second end on condition that the first power increases, and the second pointer moving towards the first end on condition that the second power increases, a variable space between the first pointer and the second pointer representing a power margin from the power plant that is not used at the rating so long as the first pointer is situated between the first end and the second pointer.

2. The method according to claim 1, wherein the first pointer is movable from the first end (69) towards the second end in a first direction when the first power increases, the second pointer being movable from the second end towards the first end in a second direction when the second power increases, a first distance between the first end and the first pointer being the image of the first power and a second distance between the second end and the second pointer being the image of the second power.

3. The method according to claim 1, wherein the method includes a step of determining with an on-board computer the first power and the second power, and a step of determining a target position on the indicator for the first pointer as a function of the first power, and a step of determining a target location on the indicator for the second pointer as a function of the second power.

4. The method according to claim 1, wherein the method includes a step of determining with an on-board computer a first current collective pitch of the first blades and a second current collective pitch of the second blades, a step of determining a target position on the indicator for the first pointer as a function of the first current collective pitch, and a step of determining a target location on the indicator for the second pointer as a function of the second current collective pitch.

5. The method according to claim 1, wherein the first pointer points to an air speed scale for the air speed of the hybrid rotorcraft (1).

6. The method according to claim 1, wherein the movement path is in the shape of a first circular arc.

7. The method according to claim 1, wherein with the first pointer pointing to an air speed scale for the air speed of the hybrid rotorcraft, and with the movement path (68) being in the shape of a first circular arc, the air speed scale is positioned on a second circular arc adjoining the first circular arc.

8. The method according to claim 7, wherein the first circular arc is situated above an artificial horizon.

9. The method according to claim 1, wherein the first pointer and the second pointer are movable linearly along a direction superposed on an air speed scale for the air speed of the hybrid rotorcraft.

10. The method according to claim 1, wherein the method includes a step of determining at least one first pitch limit for the pitch of the first blades and a step of displaying the at least one first pitch limit facing the movement path.

11. The method according to claim 1, wherein the method includes a step of determining at least one second pitch limit for the pitch of the second blades, and a step of displaying the at least one second pitch limit facing the movement path.

12. A hybrid rotorcraft, the hybrid rotorcraft having a propulsive system comprising at least one propulsive rotor provided with a plurality of first blades having a first variable pitch at least for participating in providing forward propulsion for the hybrid rotorcraft, the hybrid rotorcraft further including a lift rotor provided with a plurality of second blades having a second variable pitch at least for participating in providing lift for the hybrid rotorcraft, the hybrid rotorcraft having a power plant provided with at least one engine operating at at least one rating for driving the lift rotor in rotation and for driving each propulsive rotor of the propulsive rotor(s) in rotation;

wherein the hybrid rotorcraft includes an on-board computer and an indicator that are configured to apply the method according to claim 1.

* * * * *